United States Patent [19]
Bayer et al.

[11] 3,787,728
[45] Jan. 22, 1974

[54] IRRIGATION AND SPRINKLER SYSTEM

[75] Inventors: Donald R. Bayer, Claremont; Lewis M. Ritchie, Los Angeles; Jon A. Rivens, Upland, all of Calif.

[73] Assignee: Clemar Manufacturing Corporation, Azusa, Calif.

[22] Filed: Dec. 30, 1971

[21] Appl. No.: 214,259

[52] U.S. Cl. .................... 307/41, 307/141, 307/116
[51] Int. Cl. ............................................. H02j 3/14
[58] Field of Search 307/41, 38, 39, 40, 141, 141.4, 307/141.8, 118, 116; 340/235, 213

[56] References Cited
UNITED STATES PATENTS
3,440,434  4/1969  Yates et al............................ 307/41
3,604,943  9/1971  Bayer et al............................ 307/41

*Primary Examiner*—Herman J. Hohauser
*Attorney, Agent, or Firm*—Lyon & Lyon

[57] ABSTRACT

A watering system incorporates two selectable watering programs in one of which (Irrigation Mode) watering at each one of automatically sequentially selected stations occurs for a long time (each adjusted in the range of 1 hour to 24 hours) and in the other one of which (Environmental Mode) watering at each one of automatically sequentially selected stations occurs for a short time (each adjusted in the range of 1 minute to 30 minutes). The stations selected for watering in the irrigation mode may be different from those selected in the environmental mode. Automatic changeover from the irrigation to the environmental mode occurs in accordance with wind, heat or frost; for wind protection, crop cooling and frost protection and when the environmental program is completed the system automatically reverts back to the irrigation mode (except when the frost switch is operated, in which case a manual reset operation is required) which has memory in that the irrigation unit resumes watering under the same conditions which existed at the time of transition from the irrigation to the environmental mode. In case of rain, both systems are rendered inoperative and require manual resetting. The irrigation mode incorporates means whereby compensation may be effected in accordance with evaporation conditions.

21 Claims, 6 Drawing Figures

(IRRIGATION MODULE)

Fig. 2 (IRRIGATION MODULE)

FIG. 4.

IRRIGATION AND SPRINKLER SYSTEM

The present invention relates to improved means and techniques particularly useful in automatic watering systems.

An object of the present invention is to provide an improved automatic water-sprinkling system in which water solenoid valves at a plurality of stations or locations may be sequentially and selectively energized in accordance with two selectable programs referred to herein as an irrigation program or mode and an environmental program or mode.

Another object of the present invention is to provide a system as set forth in the preceding paragraph wherein not only the time duration of watering at the individual stations are different in the different modes but also there is flexibility in that a different sequence of watering and the use of different watering means is possible in the different modes.

Another object of the present invention is to provide a system of this character is which memory is imparted in that return of watering from the environmental mode to the irrigation mode finds the system in the same operative condition it was in at the time of transfer from the irrigation mode to the environmental mode.

Another object of the present invention is to provide a system of this character in which transition from one of such modes to the other mode may be automatically accomplished in accordance with wind or heat or frost conditions for crop protection, cooling and other purposes.

Another object of the present invention is to provide a system of this character incorporating means whereby compensation may be made in accordance with water evaporation conditions.

Another object of the present invention is to provide a system of this character which is relatively simple, inexpensive, foolproof, and flexible in its capability of satisfying the needs imposed by various environmental conditions such as rain, heat, wind and frost.

Another object of the present invention is to provide a system of this character which automatically reverts to operation in the irrigation mode after completion of the program in the environmental mode.

Another object of the present invention is to provide a system of this character for preventing watering when the ground is sufficiently moist.

Another object of the present invention is to provide a system of this character in which different ones of 20 different stations may be used in different watering programs.

Another object of the present invention is to provide a system of this character in which the irrigation mode or program may be initiated either by a clock or manually and the environmental mode or program may be substituted therefor either manually or automatically in accordance with, for example, conditions of wind, heat or frost.

Another object of the present invention is to provide a system of this character in which stations may be selected for a continuous watering performance in the irrigation mode and watering initiated without clock control, so as to have the advantage that the continuous performance is not delayed as when, for example, there is dependency for clock motor to operate a switch.

Another object of the present invention is to provide a system of this character in which components for accomplishing the irrigation mode and environmental mode are in the form of units or modules, one of which, for example, may be omitted when operation in only the irrigation mode is desired.

Another object of the present invention is to provide a system of this character is which different groups of solenoid valves may be selected for simultaneous energization either in the irrigation or environmental modes.

Although the invention is described in connection with a watering system it will be appreciated that in its broader aspects it is applicable to other systems in which elements other than valves for watering are used.

Figure 6:
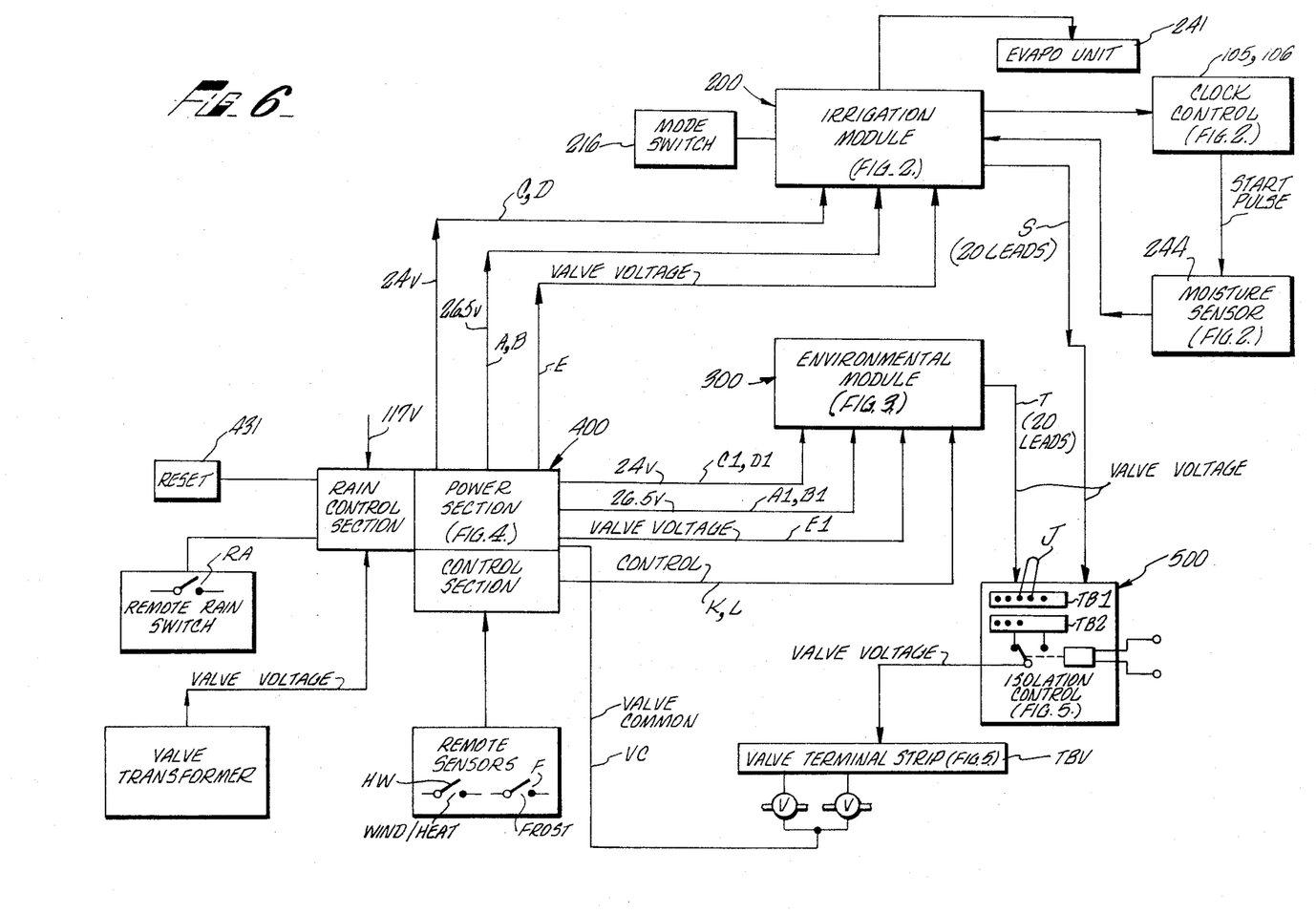
FIG. 6 is a block diagram of the system.

SYSTEM DIAGRAM, FIG. 6

The irrigation unit 200 and environmental unit 300 are alternatively effective to program the flow of electric current to electric valves (V), 20 in number, located at different locations or stations. The particular valves selected for operation in the corresponding irrigation and environmental modes are energized on a sequential basis individually or in different groups depending upon the presence of and positioning of jumpers (J) on corresponding irrigation and environmental terminal boards TB1 and TB2 respectively in isolation unit 500 to which such valves are connected.

Essentially most of the watering is accomplished in the irrigation mode with relatively long watering times at each of the sequentially energized stations. Special circumstances and considerations such as wind protection, crop cooling, frost and other circumstances demand special treatment which is accomplished by watering in the environmental modes with relatively short watering times and with the capability of using a watering program that differs from that watering program followed in the irrigation mode.

This involves switching of voltages between the various units. The irrigation unit 200 is normally effective and is normally supplied from power unit 400 with 24 volts over leads C, D with 26.5 volts over leads A, B, and a valve voltage over leads E.

These voltages are derived from a 117 volt input normally applied through the rain control section of unit 400 but in the presence of rain detected by rain switch (RA) the entire system is rendered ineffective until reset by reset control 431.

The irrigation unit 200 may be operated in either one of the following modes: Automatic, Normal or Continuous. In the Automatic mode established by setting of a mode switch 216 FIG. 2 closure of time controlled day and hour switches 105, 106 completes a circuit through the moisture sensing circuit (that circuit includes a switch 244 which is closed when the soil is sufficiently dry and requires watering) so as to initiate a sequence of events, i.e., watering at successive stations, each of which is timed for a watering interval in a continuously adjustable range of 1 hour to 24 hours. After each watering interval the unit is advanced to the next station and valve voltage is transferred over the next one of the twenty valve voltage leads to the isolation unit.

This automatic program in the unit 200 may be interrupted at any time and the program of the unit 300 substituted. Such substitution occurs for example, in response to temperature or wind conditions sensed by switches H, W, F sufficient to close such switches in which case the 24 volts is transferred over lead C1, D1, and 26.5 volts over leads A1, B1, and the valve voltage over lead E1. Control leads K, L extend between the control section of unit 400 and unit 300 and assure completion of the complete program of the unit 300 prior to retransfer of control back to the irrigation unit 200 so that there is assurance that the program of unit 300 always begins at the same place in the schedule. On the other hand the irrigation unit 200 has memory and when control is switched back to it the program commences at the point at which it was interrupted. Timing of the irrigation unit may optionally be in accordance with the float operated resistance 241 whose magnitude is representative of conditions of evaporation of water on which such float is buoyant.

WATER SOLENOID VALVE OPERATION

One or more of 20 solenoid valves 501-520 (FIGS. 1 and 5) may be energized to allow water to escape to different corresponding locations with simultaneous energization of corresponding indicating lights 511-530, one terminal of each valve being grounded and also one terminal of each of such lights is grounded via voltage limiting diode 532.

Figure 2:
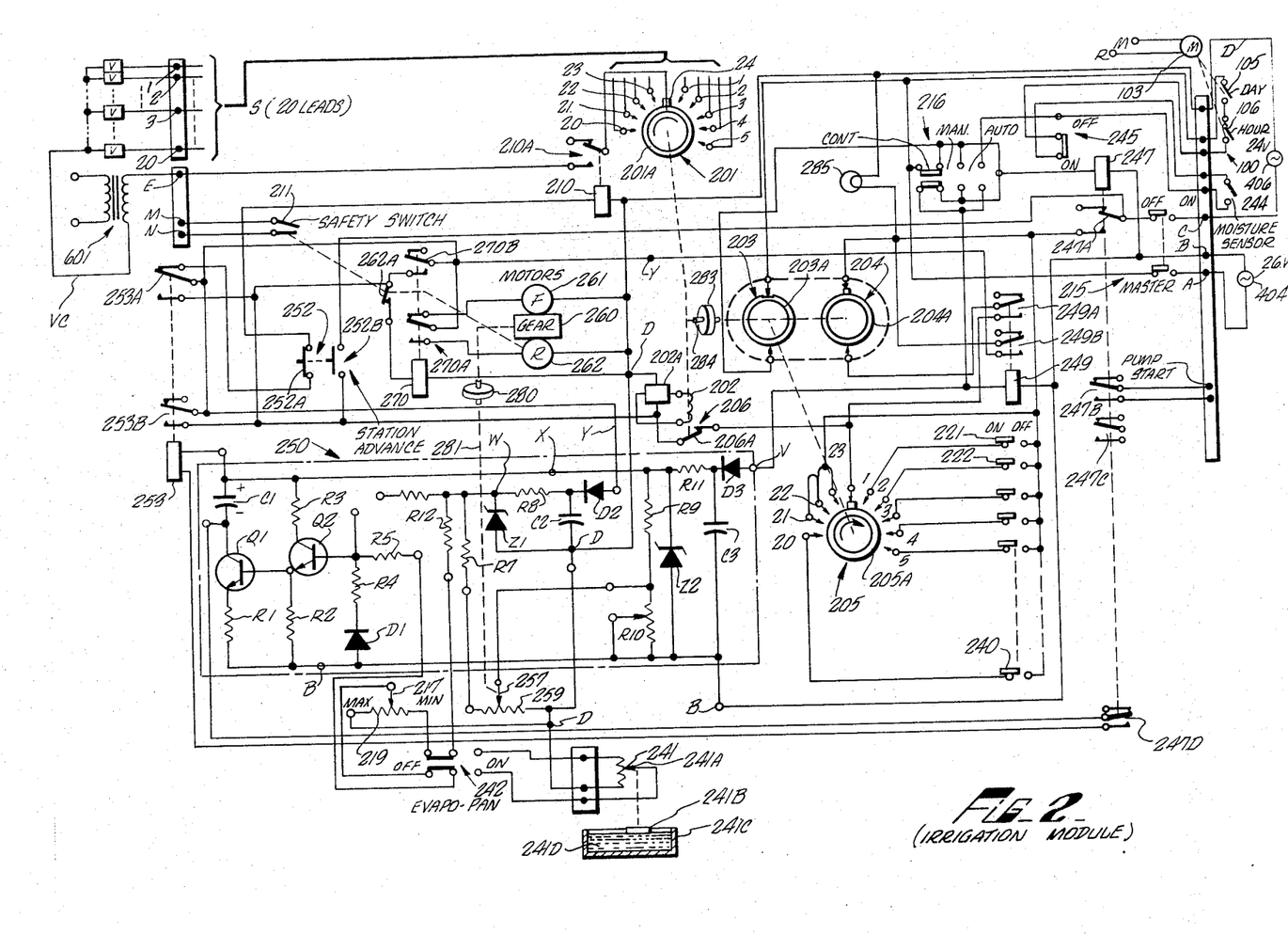
FIGS. 2, 3, 4 and 5 pertain respectively to the irrigation unit 200, environmental unit 300, power and control unit 400 and isolation unit 500 in FIG. 1 and also illustrate connections to components external of these particular units.
Figure 3:
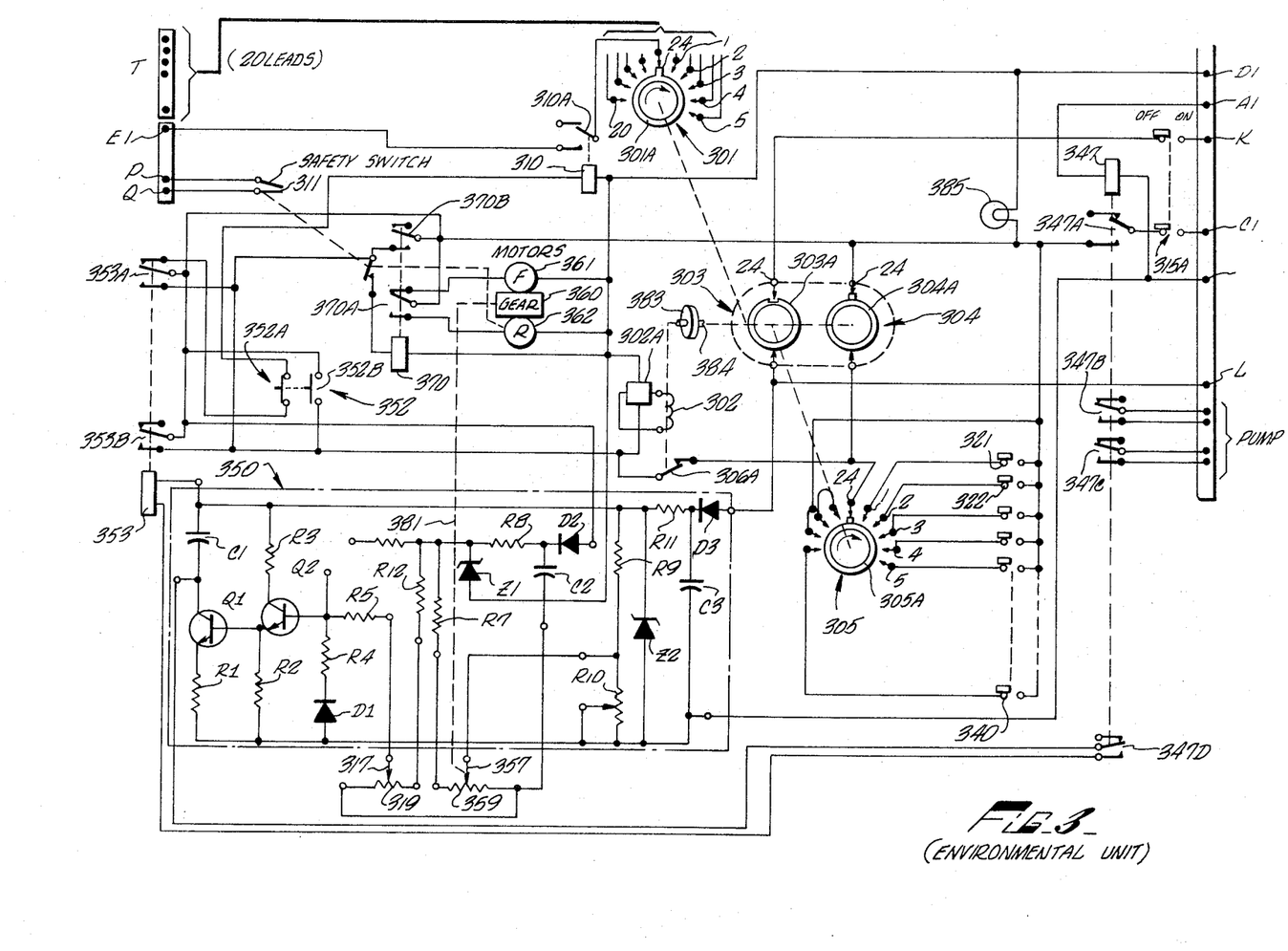
Figure 4:
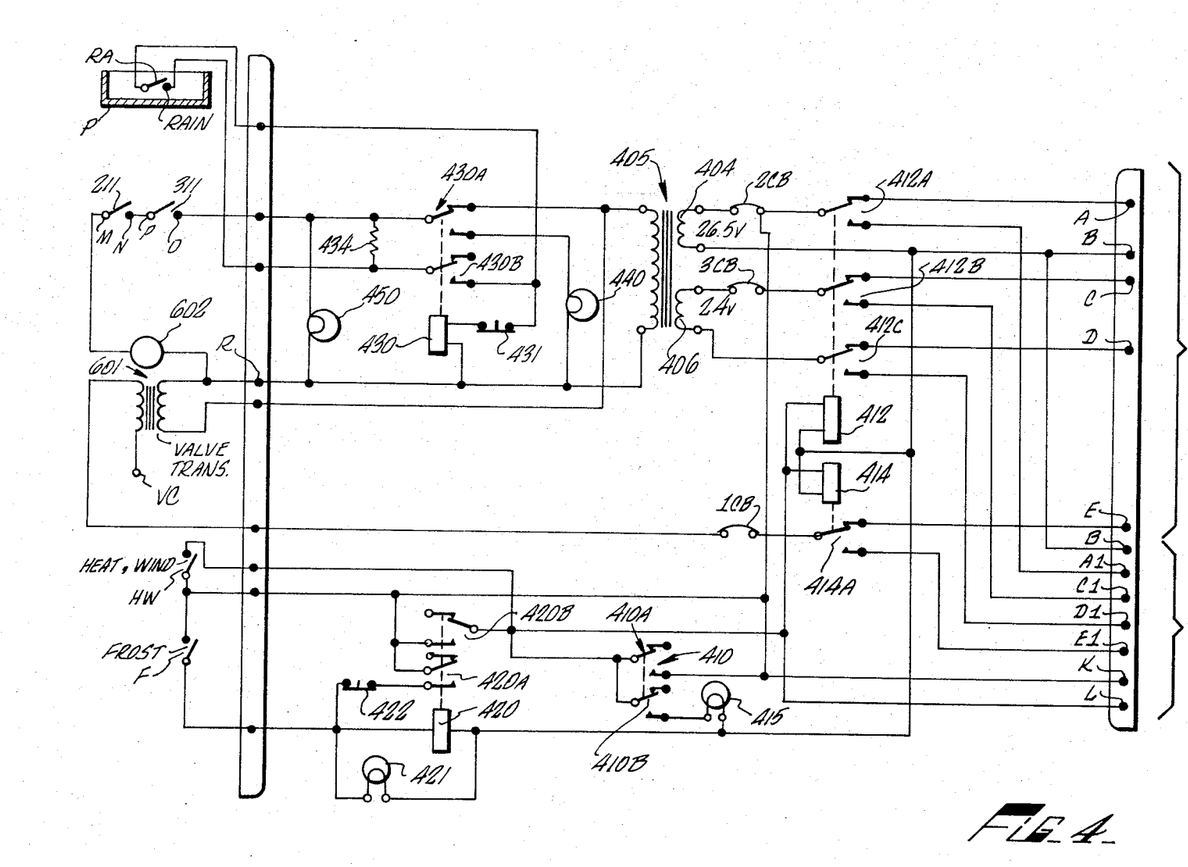
Figure 5:
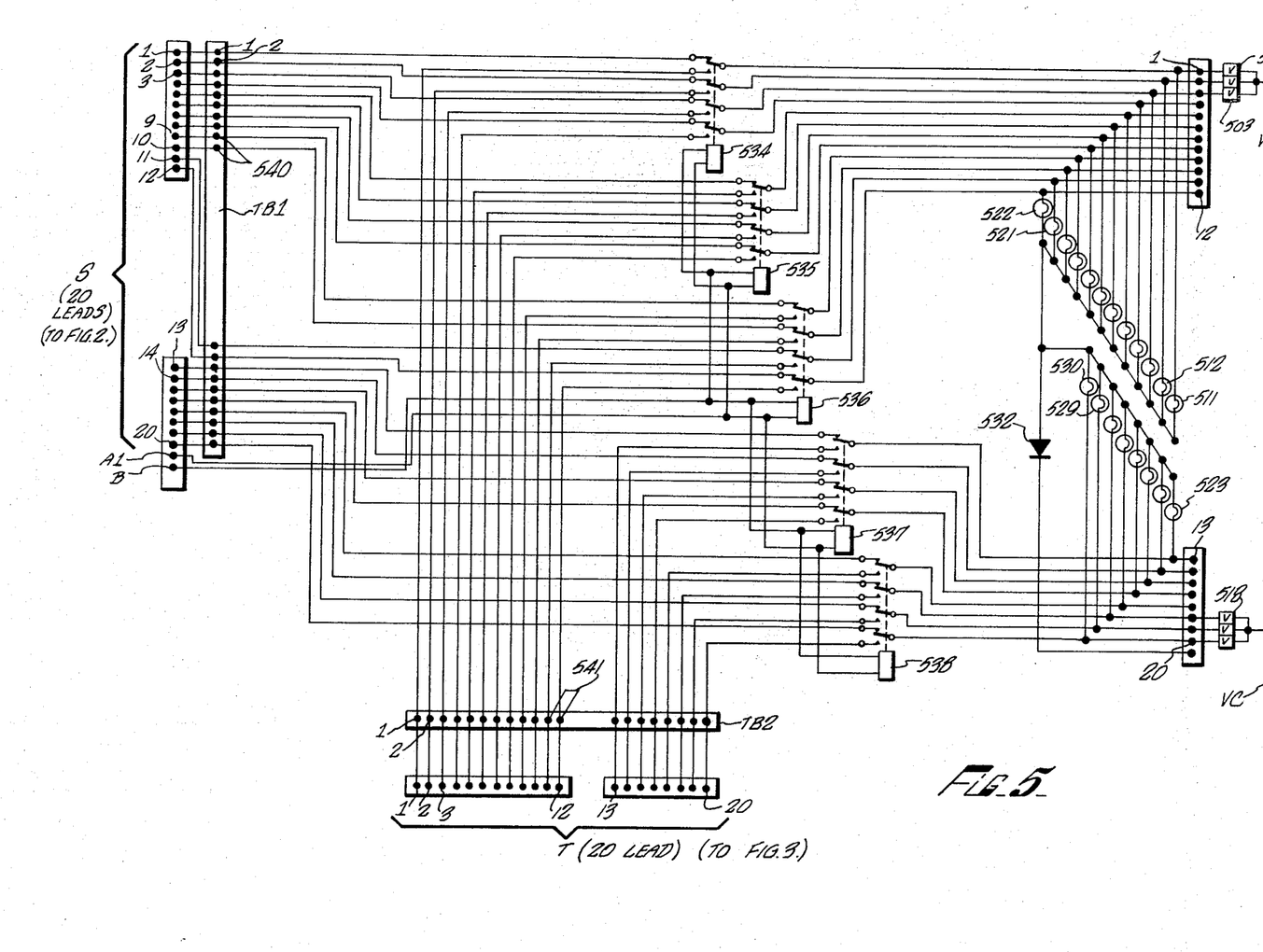

These valves may be energized from voltages supplied either via the 20 S leads extending from the Irrigation Unit, FIG. 2 to the corresponding 20 S leads of the Isolation unit, FIG. 5, in the normal deenergized condition of the five relays 534-538 in the Irrigation Mode as shown or alternatively via the 20T leads extending from the Environmental Unit, FIG. 3, to the corresponding 20T leads of the Isolation Unit, FIG. 5, when such five relays 534-538 are energized in the Environmental Mode by applying voltage to the coils of such relays 534-538 from leads B, F extending from the POwer Unit FIG. 4 to the Isolation Unit, FIG. 5.

Valves may be energized either individually or in groups. For this latter purpose, the S leads, 20 in number are connected to corresponding terminals of a terminal board TB1 of which individual terminals may be interconnected as, for example, by a connecting wire or jumper 540 between S leads 9 and 10 so as to achieve simultaneous energization of valves 509, 510. Likewise, terminal board TB2 has the individual T leads connected to corresponding terminals thereof between terminals 9 and 10 which, for example, wire 541 may extend.

The 20 S leads extend from corresponding stationary contacts of a wafer switch 201 which has its rotatable contact element 201A driveable by a stepping motor drive coil 202 together with the rotatable contact elements 203A, 204A, 205A of corresponding wafer switches 203, 204 and 205, and the movable element 206A of switch 206.

Switch element 201A energizable in succession with the 20 S leads continuously contacts the lead 208 which is connectable via the relay switch 210A and lead E extending between the Irrigation Unit and Power Unit and normally closed section of relay switch 401A, FIG. 4, to the ungrounded terminal of the secondary winding of valve transformer 601, the primary winding of transformer 601 having one of its terminals connected to one terminal of A.C. source 602 and the other one of its terminals returned to the other terminal of source 602 via the normally closed section of relay switch 403A and the two series connected safety switches 310, 210 in the Environmental and Irrigation units, FIG. 3 and FIG. 2 respectively.

The relay switch 210A is used (instead of wafer switch 201) to interrupt the heavy valve current; and for that reason, the switch 210A is opened before the wafer switch element 201A as described below in connection with producing movement of the element 201A from its "home" or twenty-fourth position shown in FIG. 2 successively through the twenty-first, twenty-second, and twenty-third "dead" stations back to the twenty-fourth "home" station.

IRRIGATION CONTROL — AUTOMATIC OPERATION

Start of Watering

Initially the "Master" switch 215 is moved from its "Off" to its "On" position, and also the three-position "Auto, Manual, Continuous" switch 216 is moved to its "Auto" position shown in FIG. 2. Automatic starting is programmed using the conventional clock timer 100 (FIGS. 1 and 2) which has 14 adjustable "day" pins 101, one for each of 14 consecutive days and 23 adjustable "hour" pins 102, one for each hour of the day except for 6:00 A.M., which is considered the start of a day; also the clock timer 100 includes a synchronous motor 103 with its leads M.R. connected to the source 602 in FIG. 4 so as to produce closure of the "day" switch 105 and "hour" switch 106 in accordance with adjustment of the corresponding series of pins 101, 102. Another adjustment involves adjusing the station timing knob 217 (FIG. 1) for a watering duration of from one to twenty-four hours as indicated in dial 218. (FIG. 2) which is adjusted to the left for a longer watering interval. Another adjustment involves setting of the 20-station selector swtiches 221-240 (FIGS. 1 and 2), one for each watering station, to either "ON" or "OFF" corresponding respectively to a closed or open condition of such switches as indicated in FIG. 2. In the "ON" position (switch open), watering occurs at corresponding station during the irrigation watering cycle; and when a switch is adjusted in the "OFF" position (switch closed), watering is omitted at that station. Further, when an evaporation pan and analog signal device (resistor 241, FIG. 2) is not being used, the "EVAPORATIVE TIMING" switch 242 (FIGS. 1 and 2) is in its "OFF" position shown in FIG. 2. A moisture sensing unit 244 (FIG. 2) may be used to detect whether or not the soil is sufficiently wet so as not to require watering. The unit 244 involves a switch which is closed when the soil is dry and which is open when the soil is wet. Thus if the soil is already sufficiently wet, the switch 244 is open and prevents a watering cycle as otherwise scheduled in the clock timer 100. If the moisture sensor 244 is to control watering, the moisture sensor switch 245 (FIGS. 1 and 2) is set to its "ON" position shown in FIG. 2; and conversely, if the moisture sensor 244 is not to control watering and watering is to occur as scheduled in the timer, the Moisture Sensor switch 245 is set to its "OFF" position. Also, when no moisture sensing switch 244 is used, switch 245 is set to its indicated "OFF" position.

Under these conditions an automatic watering cycle starts when the clock motor 103 causes its switches 105, 106 to close in which case the relay coil 247 is energized with current from source 404. Source 404 corresponds to secondary winding 404 of 26.5 volts, FIG. 4, of transformer 405 having also a secondary winding 406 of 24 volts. Such current flows from lead A through the closed lower portion of master switch 215 through "day" and "hour" switches 105, 106 through moisture sensor panel switch 245 through the remote moisture sensing switch 244 (assuming the soil is dry and thus the switch 244 being closed as illustrated) through the upper right portion of switch 216, through relay coil 247 and through the upper portion of Master Switch 215 and to the other source lead B thereby closing the associated relay switches 247A, 247B, 247C and 247D. Also relay coil 249 is energized since it is considered in parallel with relay coil 247 via the lower right portion of switch 216 in its assumed automatic position whereby also associated relay switches 249A, 249B are closed. This energized stepper motor coil 202 with current which flows from lead C of source 406 through the upper portion of Master switch 215, through relay switch 247A, through the wafer switch 204 (closed only in its 24th position as shown) through relay switch 249A, through interrupter switch 206, through the full wave rectifier 202A to which the direct current coil 202 is connected and back to the other lead D of source 406. This current through coil causes the wafer switches 201, 203, 204, 205 to be advanced to the first of its twenty-four positions corresponding to the first of twenty watering stations and also causes switch 206 to be open thereby interrupting the current flow to coil 202 whereby the conventional stepper mechanism using a conventional pawl and ratchet drive may return under conventional spring action to its normal home position preparatory for another subsequent driving action. This movement opens wafer switch 204 thereby interrupting the previous energizing circuit for coil 202 but at substantially the same time wafer switch 203 is moved from an open condition to a closed position wherein it remains closed in switch positions 1–23 inclusive thereby conditioning an energizing circuit whereby coil 202 may be subsequently energized. The previously mentioned closure of relay switch 249B results in energization of relay coil 210 with current which flows from the lead D of source 406, through coil 210, the closed section 252A of Station Advance switch 252, the normally closed relay switch 253A, relay switch 249B, relay switch 247A, the upper section of master switch 215 and to lead C of source 406. Such energization of relay coil 210 causes relay switch 210A to close thereby closing the previously described current path which now flows from lead E of secondary winding of transformer 601, through switch 210A, through the stationary contact 1 of wafer switch 201, through lead 1 of the S leads, and to valve 1 to energize the same and allow irrigating water to escape at station or location 1.

Watering thus continues at station 1 with relays 247, 249 and 210 remaining energized. In the meantime, forward motor 261 is energized through relay switch 249B and the normally closed relay switch 207A to produce movement of the tap 257 on resistor 259 from its extreme left position in FIG. 2 to begin an automatic timing operation in conjunction with the transistor circuit described in detail under the next heading. In general, when the tap 257 is moved relatively slowly to a predetermined position related electric-wise to the manually adjusted position of tap 217, the transistors Q2 and Q1 in turn are rendered sufficiently conductive to energize the relay coil 253 to terminate the watering at station 1, and to transfer watering to the next station established by the condition of switches 221–240 and to restore the timing circuit using the reverse motor 262 to move the tap 257 back relatively rapidly to its initial position.

IRRIGATION CONTROL-AUTOMATIC OPERATION

Termination of Watering by Timer

The timing circuit 250 involves the manually adjustable tap 217 on resistor 219 and the resistor 259 having its tap 257 driven through a gear train 260 by forward motor 261 during the timing interval and by the reversing motor 262 at higher speed during subsequent resetting of the tap 257 to its furthermost right position in FIG. 2 wherein it remains until a timing cycle is initiated.

The 26.5 volts A.C. which at this time appears across the leads B, V of timing unit 250 is rectified by rectifier D3 and filtered using capacitor C3 and resistor R11 to produce a d.c. bias voltage between lead X and reference lead B which voltage is controlled by Zener diode Z2. Another like rectified and controlled voltage is developed between leads W and X from the 24 volts A.C. which at this time appears across the leads using for that purpose rectifier D2, capacitor C2, resistor R8 and Zener diode Z1.

Transistor Q2 has its collector connected to lead X via resistor R3, its emitter to reference lead B via resistor R2 and its base to lead B via the series connected resistor R4 and diode D1; also that base electrode is connected via resistor R5 and the lower left-hand section of switch 242 to the tap 217 of resistor 219 which has one of its outside terminals connected to lead D and the other one of its outside terminals connected to lead W via the upper left-hand section of switch 242 and resistor R. Resistor 259 has one of its outside terminals connected to lead D, its other outside terminal connected to lead W via resistor R7 and its tap 257 is connected to the junction point in a voltage dividing circuit comprising series connected resistance R9 and adjustable resistor R10 between leads X and B.

Transistor Q1 has its collector connected to lead X via the series connected relay switch 247D and relay coil 253; its emitter is connected to lead B via resistor R1, and its base is connected to the emitter of transistor Q2. Capacitor C1 is connected between lead X and the collector of transistor Q1 for transient suppression.

Figure 1:
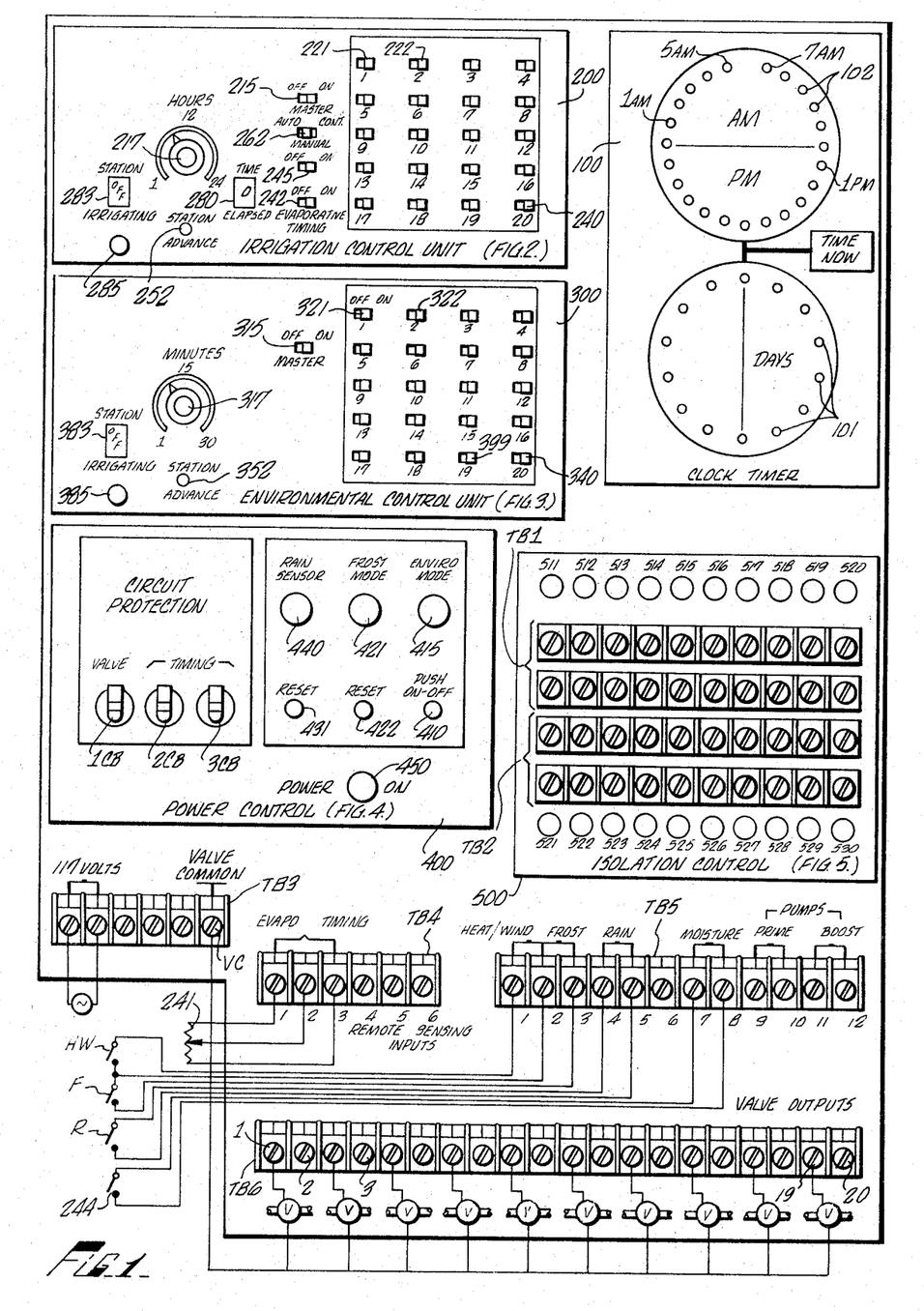
FIG. 1 is a plan view of a control panel in which various units of the control are mounted and also illustrates in schematic form connections to electrical components.

The transistor Q2 conducts heavily when the tap 257 is moved sufficiently to the left to overcome that bias on its base electrode imposed by the setting of tap 217. During such movement of tap 257 its position is indicated in terms of elapsed time on the dial 280 on that motor driven shaft represented by dotted line 281 which moves tap 257. A portion of this dial 280 for continuous reading of elapsed time appears in a window in the irrigation control panel as seen in FIG. 1. Also an indication of the number of the particular station being irrigated is readable on the dial 283 on stepper motor driven shaft 284, a portion of such dial 283 being visible through an opening in the same panel of FIG. 1.

When the transistor Q2 conducts heavily, it causes transistor Q1 to conduct sufficiently to energize relay coil 253 to thereby close its relay switches 253A, 253B to produce two results, namely, first to open valve current relay switch 210A and to advance the wafer switch 201 to the next watering station and, second, to energize the reverse motor 262 to move the tap 257 to its initial furthermost right position in FIG. 2.

More specifically, opening of the upper normally closed section of relay switch 253A interrupts the current flow through relay coil 210 thereby opening switch 210A. The stepper coil 202 is energized via the relay switch 253B which has its contacts in parallel with the contacts of the lower portion of single pole-double throw relay switch 253A. Also, closure of relay switches 253B results in energization of relay coil 270 causing power to be transferred from the forward motor 261 to the reversing motor 262 to drive the tap 257 back in 30 seconds or less from the position to which it was advanced by motor 261 within the time interval of approximately 1 hour to 24 hours depending upon the setting of tap 217. When the tap 257 reaches its "home" position, the normally closed switch 262A is opened to thereby deenergize relay coil 270 and again condition the switch 270 A for subsequent energization of forward motor 261. Should there be malfunctioning and switch 262A fail to accomplish those functions, further reverse movement by reverse motor 262 causes the safety switch 211 (FIGS. 2 and 4) to open thereby interrupting all power to the system. During that interim when coil 270 is energized, its energization is assured by closure of holding relay switch 270B which is in parallel with switch 253B. Relay coil 253 becomes deenergized during the reverse movement of tap 257 when the bias imposed by the voltage at tap 217 is sufficient to bias the transistor Q2 back to its normal relatively non conductive condition.

Watering then proceeds at the next station until the tap 257 is again automatically advanced to again stop that watering operation and advance the watering to the next station where watering occurs for a time interval established by tap 217. Particular stations may be omitted from the watering schedule by manual setting of the corresponding switch 221-240 to its "OFF" position (switch closed). Thus, for example, when switch 222 at station 2 is closed (Off position), the control is advanced to the next station where a switch is in "ON" position. This is so because when the control reaches position 2, switch 222 then applies the voltage on C lead via wafer switch 205 to the stepper coil 202 to advance the control to station 3. This sequence takes place with watering at intermediate stations until the control is advanced to station 21 where the stationary interconnected contacts 21, 22, 23 on wafer switch 205 connected to lead C are then effective to cause the control to move rapidly from the last station 20 to the home station 24..

IRRIGATION CONTROL — CONTINUOUS OPERATION

The "continuous" position of the mode of operation switch 216 causes automatic continuous recycling of the irrigation cycle. In this mode, after station 20 is watered there is an automated advance not only to the home station 24 as in the automatic mode but further to the first "ON" station. Such recycling continues until the mode of operation switch is moved either to its automatic or manual position. This is so because the upper left hand section of switch (continuous position) provides a direct connection from lead A via switch 215 to relay coil 247 so that a current path to such relay coil is not dependent upon a subsequent closure of the time switches 105, 106 for energization of stepper coil 202.

IRRIGATION CONTROL — MANUAL OPERATION

In the "MANUAL" position of the mode of operation switch 216 voltage to the timing circuit is removed. Station advancement is accomplished by manual operation of the push button switch 252. Watering at that station continues until switch 252 is again operated to advance the control to the next station or by operation of the master switch 215 to OFF position. When switch 252 is operated switch 252B applies voltage from the C lead of source 406 to one terminal of stepper coil 202 which has its other terminal connected to the D lead. Opening of switch 252A results in opening deenergization of relay coil 210 and breaking of valve current at relay switch 210 so as to break valve current at the more rugged switch 210A than at the wafer switch 201. It will be appreciated that operation of switch 252 at any time during an automatic cycle or during continuous cycle will advance the control to the next station.

IRRIGATION CONTROL — EVAPORATIVE PAN TIMING

In the "ON" position of the Evapo-Pan switch 242 the resistor 241 is substituted for resistor 259 with the tap 241A on resistor 241 being controlled in accordance with the position of a float 241B in a pan 241C of water 241D. The operation of the circuit is otherwise the same as described above but in this instance the tap 241A instead of being manually set senses the amount of evaporation loss from pan 241C and there is a conversion of this information into a resistance analog signal. Irrigation is accomplished in sufficient measured amount to compensate for previous evaporation losses at that location where irrigation takes place.

ENVIRONMENTAL CONTROL — GENERAL DESCRIPTION

The environmental unit shown in FIG. 3 is substantially identical to the irrigation unit described above in connection with FIG. 2 except for essentially the following enumerated differences, hence, like parts in FIGS. 2 and 3 have either identical reference characters or the same reference numerals that differ by 100. For example the reference numeral 202 in FIG. 2 designates a stepper coil and the like stepper coil in FIG. 3 is designated by the numeral 302.

These differences are:

1. Whereas the motor 261 in FIG. 2 drives the tap 257 at a relatively slow speed to accomplish timing in the range of one to 24 hours, the motor 361 in FIG. 3 drives the tap 357 to accomplish timing in the range of 1 to 30 minutes.

2. Some components are omitted from the environmental unit such as the following elements found only in the irrigation unit, relay coil 249 and its associated relay switches; the mode switch 216; moisture sensor switch 245; elapsed time indicator dial 283; and evaporative timing switch 242.

Either the irrigation unit 200 or the environmental unit 300 is effective at any particular time and it will be appreciated that in some cases operation may be desired using exclusively only an irrigation unit 200 operating in conjunction with the other basic units, namely the clock unit 100, the power control unit 400, and other components shown in FIG. 1.

TRANSITION FROM IRRIGATION TO ENVIRONMENTAL MODE-MANUAL

The system may be changed from the irrigation mode to the environmental mode by operating the pushbutton switch 410 (FIGS. 1 and 4) in the power unit 400. In such case the upper switch section 410A completes a current path which extends from the upper terminal of source 404, switch 410A to lead L and also to the parallel connected relay coils 412, 414, and lower terminal of source 404 thereby operating the four single pole, double throw relay switches 412A, 412B 412C and 414A from their irrigation position shown to their other environmental position where new voltages are transferred from leads A, C, D, E respectively to leads A1, C1, D1 and E1, thereby de-energizing the irrigation unit 200 (FIG. 2) energizing the environmental unit 300. This condition is indicated by light 415 which is now energized, the light 285 in the irrigation unit being now de-energized. The voltage on lead A1 appears also on the lead A1 in the isolation unit 500 (FIG. 5) thereby producing energization of each of the five relays 534–538 whereby the valve voltages are supplied now in turn over the set of T leads instead of over the S leads. The cycle of events then begins in the environmental unit as a result of the relay coil 347 being energized to in turn close its switch 374A and a current path for the stepper coil 302 which includes lead C1, switch 315, relay switch 347A, wafer switch 304, interrupter switch 306, coil 302 and lead D1. The operation in the environmental unit is then as described above in connection with the irrigation unit with watering beginning at for example station 1 and then after a time interval established by the setting 1f tap 317 the watering is transferred to the next station selected by switches 321–340 until all stations are watered after which the control reaches the home position 24 of the wafer switches but unless in the meantime the switch 410 is actuated to its off position shown in FIG. 4, the control moves from its twenty-fourth position to the first watering position and so forth. To return control of the system to the irrigation unit the switch 410 is returned to its normal position shown in FIG. 4 in which case even though the switch 410 is open the environment unit continues to complete a cycle to the twenty-fourth wafer position as a result of the voltage applied via leads K and L to the relay coils 412, 414 maintaining them energized until the wafer switch 303 moves to its twenty-fourth position and thereby de-energizes coils 412, 414 whereupon the irrigation control resumes its control at the same watering station and at the same elapsed time condition it was in at the time such transfer took place from the irrigation unit to the environment unit. In other words, the irrigation unit functions with memory in that if interruption occurs, for example when the wafer switches are in their fourth watering station, and for example, the motor driven tap 257 is in an intermediate position such switches and tap remain in those positions until control is transferred back to the irrigation unit.

TRANSITION FROM IRRIGATION TO ENVIRONMENTAL MODE HEAT OR WIND ACTIVATION

Heat and/or wind sensors may be incorporated each of which is represented by the switch HW. These sensors are of course remotely located at representative advantageous locations and each involves a switch which closes when, for example, there is a wind of larger than a particular velocity for wind protection. Also for purposes of crop cooling the switch closes when the environmental temperature exceeds a particular temperature. Such representative switch HW is connected in parallel with the previously described switch 410A and its closure and opening produces the same functions and results described above in connection with operation of switch 410.

TRANSITION FROM IRRIGATION TO ENVIRONMENTAL MODE FROST ACTIVATION

The switch F (FIG. 5) is representative of temperature sensor in which such switch F closes when the temperature drops and approaches the frost level. When switch F closes relay coil 420 is energized in a path which includes the upper terminal of source 404, switch F coil 420 and the lower terminal of source 404 also causing light 421 to be lit. Associated relay switch 420A closes and is in series with normally closed reset switch 422 which are in parallel with switch F to thereby provide a holding circuit for continued energization of coil 420 should switch F subsequently open as a result of its temperature rising by subsequent watering. Relay switch 420B is in parallel with the switch 410A and its closure and opening produces the same functions and results indicated above in the description of operation of switch 410. Watering under frost conditions thus continues until interrupted by manual opening of the reset switch 422.

RAIN CONDITIONS

A rain sensor involves a rain collecting pan P (FIG. 4) and rain switch RA which is closed when sufficient rain accumulates in the pan. Switch RA, when closed energizes relay coil 430 with a current which flows from one terminal of the primary winding of transformer 405, normally closed section of relay switch 403A, resistor 434, switch RA, normally closed rest switch 431, coil 430 and the other primary winding terminal to thereby activate the switches 403A, 403B. Closure of the lower portion of switch 403A energizes the rain indicating light 440. Closure of switch 403B serves to maintain coil 430 energized in a path which includes coil 430, reset switch 431, switch 430B, resistor 434, switches 211, 311 and source 602. This energization of coil 430 disconnects power not only to the transformer 405 but also to the valve transformer 601 regardless of whether or not the rain occurred either prior to or during either the irrigation or environmental cycle. The rain circuit is reset by removing the water from pan P and also by opening the reset switch 431 after which the system is again conditioned for operation in either of the two modes.

We claim:

1. In a programming system; a plurality of controls including a first series of controls and a second series of controls; first means for sequentially activating said first series of said controls and effecting thereby a first series of operations in the performance of a first mode of operation; second means for sequentially activating said second series of said controls and effecting thereby a second series of operations in the performance of a second mode of operation which is different from said first mode of operation; initiating means for rendering said first means effective; condition responsive means responsive to a condition for rendering said second means effective and said first means ineffective to thereby change from said first mode of operation to said second mode of operation.

2. A system as set forth in claim 1 in which the controls in said first and second series are the same controls.

3. A system as set forth in claim 1 in which the controls in said first and second series are different controls.

4. A system as set forth in claim 1 in which said initiating means is a clock controlled means.

5. A system as set forth in claim 1 in which said initiating means is a manually operable means including a three position element which in a first "automatic" position is effective to initiate operation of said first means by a clock controlled means, which in a second "manual" position is effective to initiate operation of said first means such that it becomes ineffective upon completion of said first program and which in a third "continuous" position is effective to cause said first means to initiate another one of said first programs after completion of said first program.

6. A system as set forth in claim 1 including means for automatically restoring said second means to an initial state after said second means is rendered ineffective prior to completion of said second program.

7. A system as set forth in claim 1 in which said first means remains in that state in said first program in which it was at the time the same was rendered ineffective until said first means is again rendered effective.

8. A system as set forth in claim 1 in which said condition is wind and wind responsive means initiates operation of said second means and renders said first means ineffective.

9. A system as set forth in claim 1 in which said condition is temperature and temperature responsive means initiates operation of said second means and renders said first means ineffective.

10. A system as set forth in claim 1 in which said condition is frost and frost responsive means initiates operation of said second means and renders said first means ineffective.

11. A system as set forth in claim 8 in which upon cessation of said condition, said second means is rendered ineffective and said first means is rendered effective.

12. A system as set forth in claim 9 in which upon cessation of said condition, said second means is rendered ineffective and said first means is rendered effective.

13. A system as set forth in claim 10 in which upon cessation of said condition said frost responsive means requires a resetting operation.

14. A system as set forth in claim 1 in which said first means includes timing means to adjust the time duration of activation of said controls; said timing means including a first adjustable impedance; evaporation responsive means including a second impedance whose magnitude changes with evaporation conditions; and switching means for connecting either said first impedance or said second impedance in said timing means.

15. A system as set forth in claim 1 including timing means for controlling the time duration of activation of said controls; and means for indicating the condition of said timing means.

16. A system as set forth in claim 1 including means for either inserting or removing specific ones of said controls from said programs.

17. A system as set forth in claim 16 including means for indicating that specific control which is effective.

18. A system as set forth in claim 1 including rain condition responsive means for rendering said first and second means ineffective.

19. A system as set forth in claim 18 including means for resetting said rain condition responsive means.

20. A system as set forth in claim 1 including means for interconnecting particular ones of said controls for operation as a group.

21. A system as set forth in claim 1 including moisture responsive means for controlling said first means.

* * * * *

UNITED STATES PATENT OFFICE
CERTIFICATE OF CORRECTION

Patent No. 3,787,728  Dated January 22, 1974

Inventor(s) Donald R. Bayer et al.

It is certified that error appears in the above-identified patent and that said Letters Patent are hereby corrected as shown below:

On the cover sheet in item [75], "Rivens" should read -- Bivens --.

Signed and sealed this 3rd day of September 1974.

(SEAL)
Attest:

McCOY M. GIBSON, JR.
Attesting Officer

C. MARSHALL DANN
Commissioner of Patents